United States Patent [19]
Purohit et al.

[11] Patent Number: 5,519,695
[45] Date of Patent: May 21, 1996

[54] SWITCH ELEMENT FOR FIBER CHANNEL NETWORKS

[75] Inventors: Robin Purohit; Bent Stoevhase, both of Toronto; Kumar Mallavalli, Markham, all of Canada

[73] Assignee: Hewlett-Packard Company, Palo Alto, Calif.

[21] Appl. No.: 330,155

[22] Filed: Oct. 27, 1994

[51] Int. Cl.[6] .................................................. H04J 14/08
[52] U.S. Cl. ........................ 370/58.2; 370/68.1; 359/117
[58] Field of Search .................................. 370/58.1, 58.2, 370/58.3, 60, 60.1, 61, 68.1, 94.1, 94.2; 359/117

[56] References Cited

U.S. PATENT DOCUMENTS 5,418,779  5/1995  Yemini et al. ..................... 370/58.1 X Primary Examiner—Melvin Marcelo
Attorney, Agent, or Firm—Patrick J. Murphy

[57] ABSTRACT

A system for facilitating data communications in a fiber channel network is presented. The system comprises a fiber optic switch element which enables implementation of a Fiber Channel network by permitting selective interconnection of a plurality of fiber optic channels. The fiber optic switch element permits both circuit and frame switching. The switch element comprises a switch module which is connected to at least one fabric-port within the fiber channel fabric. The switch module allocates switching bandwidth. A path allocation system, which is connected to the switch module, generally directs frames of data between the at least one fabric-port to other fabric-ports located within the fabric. A channel module comprising a port intelligence mechanism is disposed between the switch module and the fabric-ports. An element controller provides centralized fabric management.

6 Claims, 7 Drawing Sheets

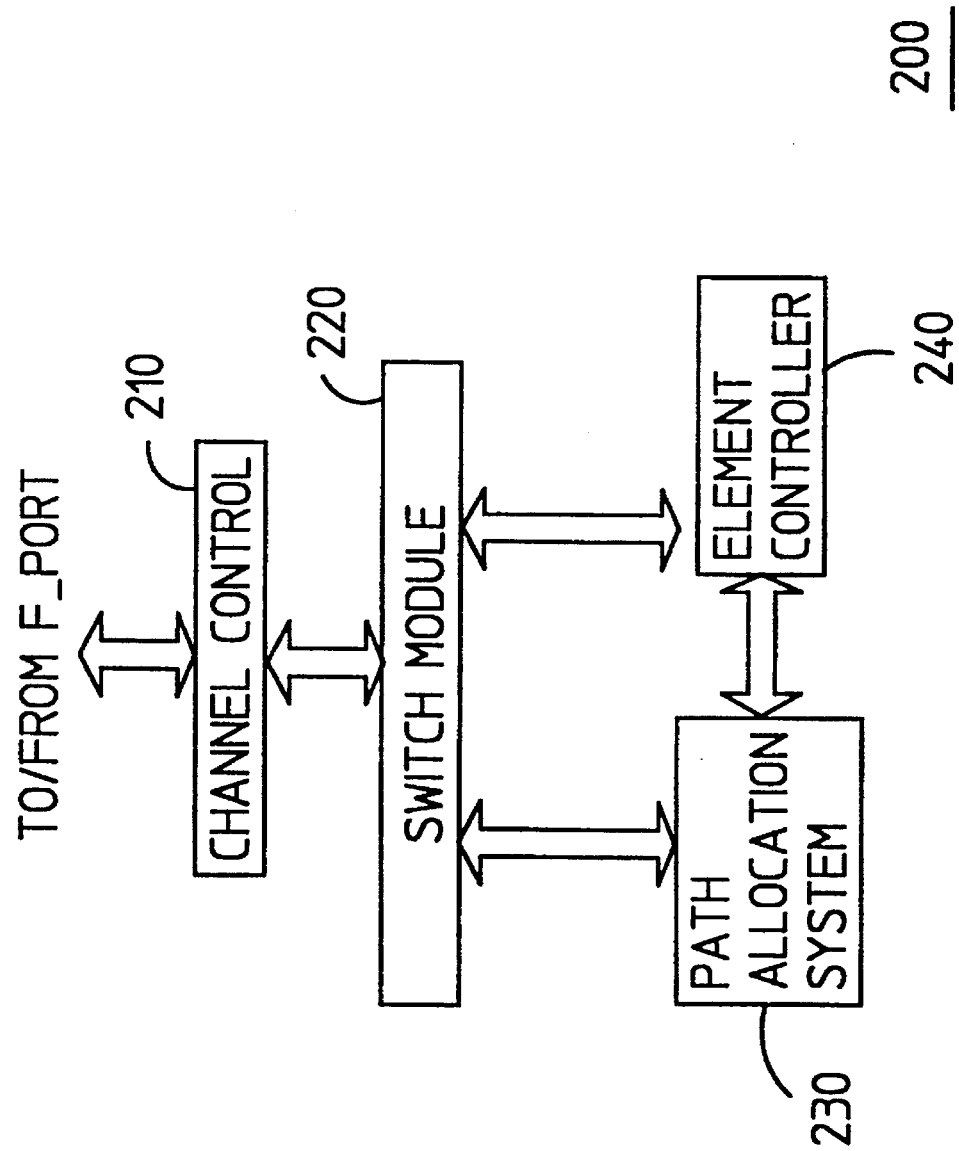

SWITCH ELEMENT FOR FIBER CHANNEL NETWORKS

CROSS REFERENCE TO RELATED APPLICATIONS

The following applications of common assignee contain some common disclosure, and are believed to have an effective filing date identical with that of the present invention:

PATH ALLOCATION SYSTEM AND METHOD HAVING DOUBLE LINK LIST QUEUES IMPLEMENTED WITH A DIGITAL SIGNAL PROCESSOR (DSP) FOR A HIGH PERFORMANCE FIBER OPTIC SWITCH, Ser. No. 08/330,044 filed Oct. 27, 1994;

HIGH PERFORMANCE PATH ALLOCATION SYSTEM AND METHOD FOR A FIBER OPTIC SWITCH FOR A FIBER OPTIC NETWORK, Ser. No. 08/330,169 filed Oct. 27, 1994;

HIGH PERFORMANCE PATH ALLOCATION SYSTEM AND METHOD WITH FAIRNESS INSURANCE MECHANISM FOR A FIBER OPTIC SWITCH, Ser. No. 08/330,273 filed Oct. 27, 1994;

CHANNEL MODULE FOR A FIBER OPTIC SWITCH WITH BIT SLICED MEMORY ARCHITECTURE FOR DATA FRAME STORAGE, Ser. No. 08/330,279 filed Oct. 27, 1994.

The disclosures of the above referenced applications are incorporated by reference herein as if set forth in full below.

FIELD OF THE INVENTION

The present invention relates generally to high speed data communications networks and more particularly to a switch mechanism for controlling the flow of data on a fibre channel network.

BACKGROUND OF THE INVENTION

Mainframes, super computers, mass storage systems, workstations and very high resolution display subsystems are frequently connected together to facilitate file and print sharing. Common networks and channels used for these types of connections oftentimes introduce communications bottlenecking, especially in cases where the data is in a large file format typical of graphically-based applications.

There are two basic types of data communications connections between processors, and between a processor and peripherals. A "channel" provides a direct or switched point-to-point connection between communicating devices. The channel's primary task is merely to transport data at the highest possible data rate with the least amount of delay. Channels typically perform simple error correction in hardware. A "network," by contrast, is an aggregation of distributed nodes (e.g., workstations, mass storage units) with its own protocol that supports interaction among these nodes. Typically, each node contends for the transmission medium, and each node must be capable of recognizing error conditions on the network and must provide the error management required to recover from the error conditions One type of communications interconnect that has been developed is Fibre Channel. The Fibre channel protocol was developed and adopted as the American National Standard for Information Systems (ANSI). See *Fibre Channel Physical and Signalling Interface,* Revision 4.2, American National Standard for Information Systems (ANSI) (1993) for a detailed discussion of the fibre channel standard.

Briefly, fibre channel is a switched protocol that allows concurrent communication among workstations, super computers and various peripherals. The total network bandwidth provided by fibre channel is on the order of a terabit per second. Fibre channel is capable of transmitting data frames at rates exceeding 1 gigabit per second in both directions simultaneously. It is also able to transport existing protocols such as internet protocol (IP), small computer system interface (SCSI), high performance parallel interface (HIPPI) and intelligent peripheral interface (IPI) over both optical fiber and copper cable.

Essentially, the fibre channel is a channel-network hybrid, containing enough network features to provide the needed connectivity, distance and protocol multiplexing, and enough channel features to retain simplicity, repeatable performance and reliable delivery. Fibre channel allows for an active, intelligent interconnection scheme, known as a "fabric," to connect devices. A fabric is an entity that interconnects various node-ports (N_ports) attached to the fabric. The fabric has the capability of routing data frames based upon information contained within the frames as specified by a class of service. The N_port simply manages the simple point-to-point connection between itself and the fabric. That transmission is isolated from the control protocol so that different topologies (e.g., point-to-point links, rings, multidrop buses, crosspoint switches) can be implemented. The fabric is self-managed so that N_ports do not need station management functionality, greatly simplifying system implementation.

SUMMARY OF THE INVENTION

The present invention provides a novel switch element for a fiber optic network. The fiber optic switch element enables implementation of a fibre channel network by permitting selective interconnection of a plurality of fiber optic channels. The fiber optic switch permits both circuit and frame switching. Circuit switching enables data transfer on a dedicated connection. In the circuit-switched mode, a dedicated path between two N_ports is established before data transfer occurs. This dedicated path is maintained until either of the two N_ports disconnects. Frame switching is a connectionless data transfer mode in which the bandwidth is dynamically allocated on a frame-by-frame basis.

The fiber optic switch element comprises a switch module which is connected to a fabric-port (F_port) within the fibre channel fabric through a channel control box. The switch module allocates switching bandwidth. A path allocation system, which is connected to the switch module, generally directs frames between F_ports through the switch module. The path allocation system is essentially a specialized multiprocessor subsystem for the allocation and control of switching and port resources. An element controller, which is connected to the path allocation system and switch module, provides centralized fabric management.

A plurality of ports are associated respectively with the plurality of fiber optic channels of the network. Each of the ports has a corresponding port intelligence mechanism, which comprises a transmitter and a receiver. The port intelligence mechanisms are located within the channel control box. The channel control box also comprises a memory interface system which has receive memory and is associated with the plurality of the port intelligence mechanisms (or ports) for temporarily storing incoming new data frames from source ports for class 2 data transfers (frame switching). The memory interface system has bypass paths for class 1 data transfers (circuit switching).

The switch module includes, among other things, a main distribution network (MDN), an intermix distribution network (IDN), and a control distribution network (CDN). The switch module and the data passed through the switch module are controlled by the path allocation system. The path allocation system comprises an arbitrator and a scheduler. The scheduler maintains a destination queue corresponding with each of the ports. Each queue is configured to store queue entries specifying data destined for its corresponding port. Each queue entry comprises a source port indicator which identifies a source channel module and a buffer indicator which identifies a particular buffer within the receive memory of the source channel module, where the data frame can be found. The arbitrator ultimately controls data transfers through the switch module and communicates with the scheduler and the port intelligence mechanisms. The arbitrator determines when the ports are available or are busy servicing other data transfer requests. If available, the arbitrator allows communication (class 1 transfer or class 2 transfer) of the data between ports via the MDN or IDN of the switch module.

BRIEF DESCRIPTION OF THE DRAWINGS

FIG. 2 shows a block diagram of a fiber optic switch element according to the present invention.

DETAILED DESCRIPTION OF THE PREFERRED EMBODIMENT

Briefly, the present invention provides a fiber optic switch element based upon a parallel, non-blocking, cross-point architecture with centralized control. The switch element supports both circuit- and frame-switched connections for multiple baud rate interfaces.

As used herein, these terms and phrases are defined as follows:

Class 1 service—a circuit-switched connection;

Class 2 service—a connectionless, frame-switched link providing guaranteed delivery and receipt notification;

Class 3 service—a connectionless service with no confirmation;

F_port—"fabric" port, the access point of the Fabric for physically connecting N_ports;

Fabric—a Fibre Channel-defined interconnection methodology that handles routing in Fibre Channel networks;

Frame—a linear set of transmitted bits that define a basic transport element;

Intermix—a class of service that provides functionality of both Class 1 and 2, Intermix reserves the full channel for a Class 1 connection while allowing Class 2 traffic to pass on unused bandwidth;

Link—a communications channel;

N_port—"node" port, a Fibre Channel-defined hardware entity at the node end of a link.

Figure 1A:
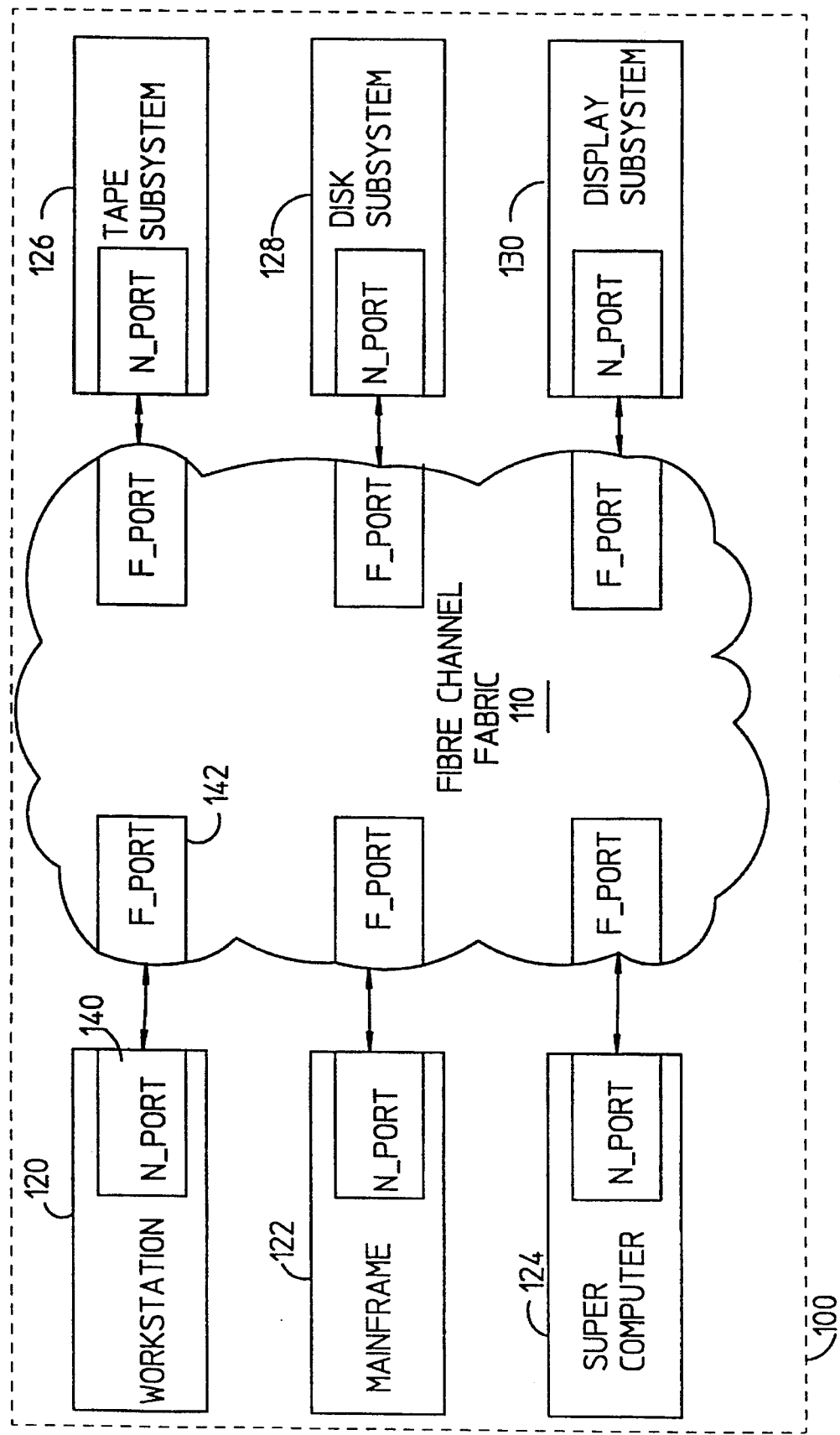
FIG. 1a shows a block diagram of a representative Fibre Channel architecture.

Refer now to FIG. 1a which shows a block diagram of a representative fibre channel architecture. A fibre channel network 100 is presented. A workstation 120, a mainframe 122 and a super computer 124 are interconnected with various subsystems (e.g., a tape subsystem 126, a disk subsystem 128, and a display subsystem 130) via a fibre channel fabric 110. The fabric 110 is an entity that interconnects various node-ports (N_ports) attached to the fabric 110. The essential function of the fabric 110 is to receive frames of data from a source N_port and, using a first protocol, route the frames to a destination N_port. In a preferred embodiment, the first protocol is the fibre channel protocol. Other protocols, such as the asynchronous transfer mode (ATM) could be used without departing from the scope of the present invention.

Each of the various systems and subsystems (e.g., the workstation 120, the tape subsystem 126) connected to the fibre channel fabric 110 comprises an associated N-port 140. The N_port is a hardware entity at the node end of a link. The F-port 142 is the access point of the fabric 110 for physically connecting the various N-ports 140. The fabric 110 has the capability of routing data frames (see FIG. 1b below) based upon information contained within the frames as specified by a class of service. The N_port simply manages the simple point-to-point connection between itself and the fabric 110. That transmission is isolated from the control protocol so that different topologies (e.g., point-to-point links, rings, multidrop buses, crosspoint switches) can be implemented. The fabric 110 is self-managed so that N ports do not need station management functionality, greatly simplifying system implementation.

Figure 1B:
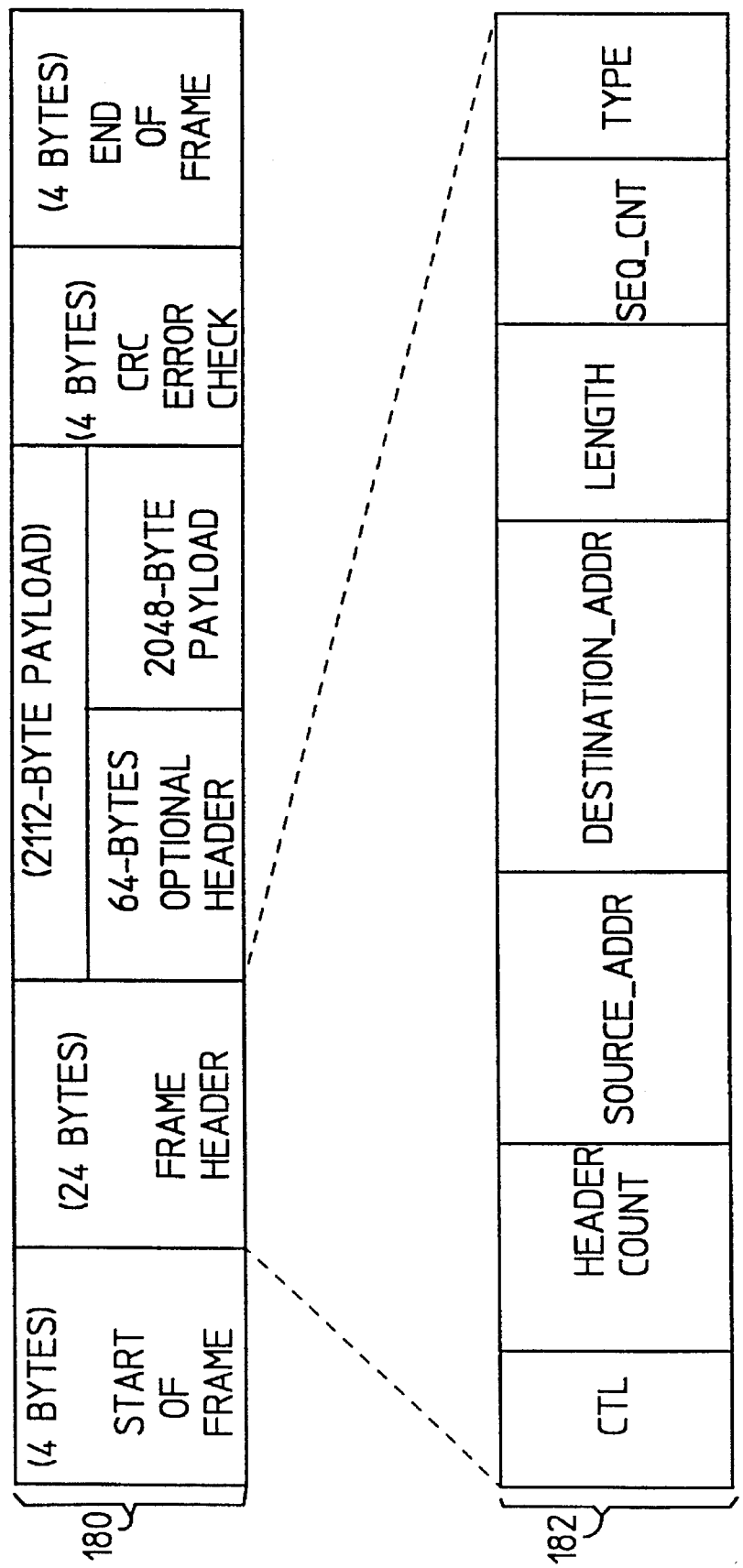
FIG 1b shows the frame protocol of the Fibre Channel.

FIG 1b shows the frame protocol of the fibre channel. In a preferred embodiment, the protocol can be up to 2,148 bytes wide, depending upon the size of the payload. A frame 180 is the smallest indivisible packet of data that is sent through a fibre channel network. Addressing of the frame 180 is done within the frame header 182 which is 24 bytes long. Frames are not visible to the upper-level protocols and consist of the following fields:

a start-of-frame delimiter (4 bytes);

a frame header (24 bytes);

optional headers (64 bytes);

a variable-length payload containing user data (from 0 to 2048 bytes);

a cyclic redundancy check error check (4 bytes); and an end-of-frame delimiter (4 bytes).

The frame header 182 can be further defined as shown. The addressing of the frame 180 is accomplished using a source address (SOURCE_ADDR) and destination address (DESTINATION_ADDR). Each connected N_port has a unique address identifier. The length of the user clam that is encapsulated within the frame 180 is defined within the header 182 under the LENGTH field.

FIG. 2 shows a block diagram of a fiber optic switch element according to the present invention. The fiber optic switch element 200 enables implementation of a fibre channel network by permitting selective interconnection of a plurality of fiber optic channels (not shown). The fiber optic switch 200 permits both circuit and frame switching. Circuit switching enables data transfer on a dedicated connection. In the circuit-switched mode, a dedicated path between two N_ports is established before data transfer occurs. This dedicated path is maintained until either of the two N_ports disconnects. Frame switching is a connectionless data transfer mode in which the bandwidth is dynamically allocated on a frame-by-frame basis.

A switch module 220 is connected to an F_port within the fibre channel fabric through a channel control box 210. The switch module 220 is responsible for core switching bandwidth. A path allocation system 230, which is connected to the switch module 220, generally directs frames between F_ports (logically located within the channel control box 210) through the switch module 220. The path allocation system 230 is essentially a specialized multi-processor subsystem for the allocation and control of switching and port resources. Frame switching requires a relatively large amount of buffering while circuit switching requires pre-allocation of switching bandwidth. To accomplish both, the fiber optic switch element 200 provides local buffering at the channel control box 210 with centralized routing hardware in the path allocation system 230. In a preferred embodiment, them are two modes of buffering. The first mode is known as "cut-through" mode buffering. Cut-through mode allows frame data to be read as the frame is being written to the buffer. This mode facilitates faster routing of the data frames through the switch element 200. The channel control box 210 typically operates under the cut-through mode. The second mode is known as "store-and-forward" mode buffering. This mode resembles the more standard type of buffering in which the entire frame is written to the buffer before it can be read out. The store-and-forward mode is typically used during intermix operation, for example.

An element controller 240, which is connected to the path allocation system 230 and switch module 220, provides centralized fabric management. A feature of the element controller 230 is an embedded port to communicate with N_ports.

Figure 3:
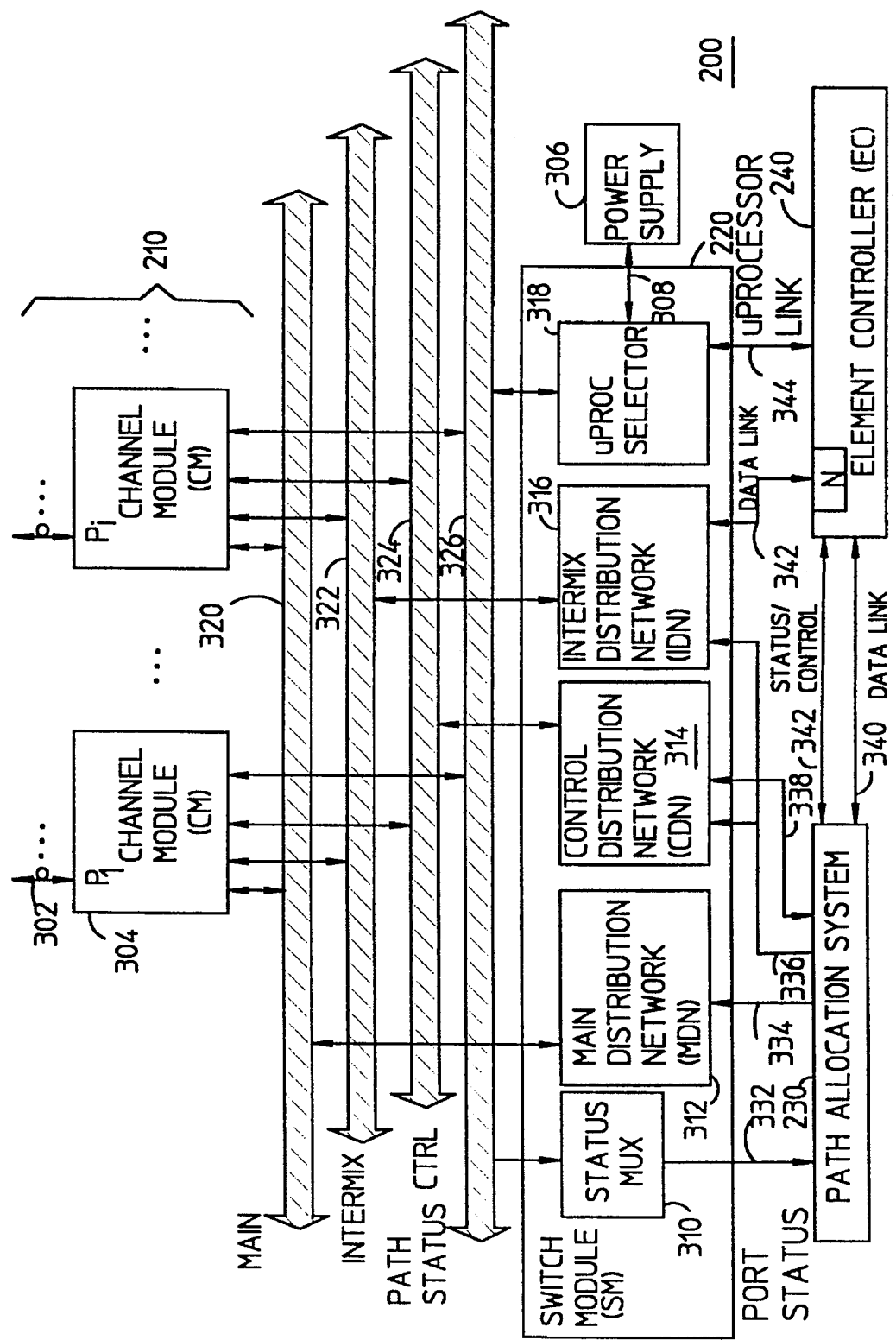
FIG. 3 shows a more detailed block diagram of the fiber optic switch element.

FIG. 3 shows a more detailed block diagram of the fiber optic switch element 200. The fiber optic switch 200 has a plurality of channel modules 304 to which the fiber optic channels 302 are connected via respective ports $p_1$ through $p_i$. In a preferred embodiment, there are 4 channel modules, each providing a 266 MBaud bi-directional path into the fabric. Other configurations can be implemented without departing from the scope of the present invention. For example, two 531 MBaud channel modules or a single 1063 MBaud channel module could be used.

Each channel module 304 is connected to one or more of the fiber optic channels 302 and provides port intelligence as well as receive memory for temporarily storing data frames. The channel modules 304 are connected to the switch module 220, which distributes electrical energy from a power supply 306 via connection 308. In the preferred embodiment, the switch module 220 is implemented as part of a back plane; a number of functional interface elements are disposed upon the back plane.

The switch module 220 has a status multiplexer (MUX) 310 which is configured to receive status signals from the channel module 304 concerning the fiber optic channels 302. A main distribution network (MDN) 312 selectively interconnects the data paths of the channels 302. In a preferred embodiment, the MDN 312 is a 16×16 non-blocking crosspoint switch. A control distribution network (CDN) 314 communicates control signals to the various channel modules 304. For example the CDN 314 informs channel modules when a data frame may be sent. An intermix distribution network (IDN) 316 selectively interconnects intermix paths between channel modules 304. Intermix paths are a set of alternate data paths which are separate from those data paths associated with the MDN 312 and which can permit data flow between selected channels 302 while data paths of the MDN 312 are in use. In a preferred embodiment, both the CDN 314 and the IDN 316 are implemented by a 8×8 crosspoint switch. Finally, a processor (uProc) selector 318 can optionally be provided as part of an auxiliary system for interconnecting processors and controllers distributed throughout the fiber optic switch 200. Additionally, the uProc selector 318 facilitates "off-line" service of the switch 200.

The path allocation system 230 is connected to the switch module 220 and, particularly, to the status MUX 310, the MDN 312, the CDN 314 and the IDN 316. The path allocation system 230 generally allocates data interconnect paths between fiber optic channels 302 and determines the priority of the connections. The path allocation system 230 is a significant element of the present invention and because of its design, results in very desirable performance attributes with minimum hardware requirements (see FIG. 6).

Also connected to the switch module 230 is an element controller (EC) 240. The EC 240 essentially provides servers (e.g., a name server, a time server) for the fiber optic switch element 200. The EC 240 has a data link 340 with the path allocation system 230 for communicating server information and a status/control connection 342 for exchanging status/control signals with the path allocation system 230. The EC 240 also exchanges server information with the IDN 316 and the processor selector 318 via respective links 342,344. Data link 342 provides an embedded port into the element controller 240. The embedded port behaves essentially as an N_port which can be addressed as if it were another system connected to the switch 200. The embedded port facilitates operator control of the switch element 200. For example, when a system such as a workstation plugs into the switch for the first time, the system will attempt to communicate with the switch 200 by logging on. The embedded port will send switch configuration information back to the new system and will provide information indicative of the other systems and subsystems that are already connected to the switch 200.

The EC 240 comprises a microprocessor and various memory elements including a flash EPROM, RAM and a Boot ROM. The Boot ROM stores a Boot Manager and self-test software for the EC 240. The flask EPROM is used to store an operating system, such as VxWorks, available from Wind River Systems, U.S.A., and additional firmware for the switch module and path allocation system. In a preferred embodiment, the microprocessor within the EC 240 is a model i960CA, manufactured by Intel.

Figure 4:
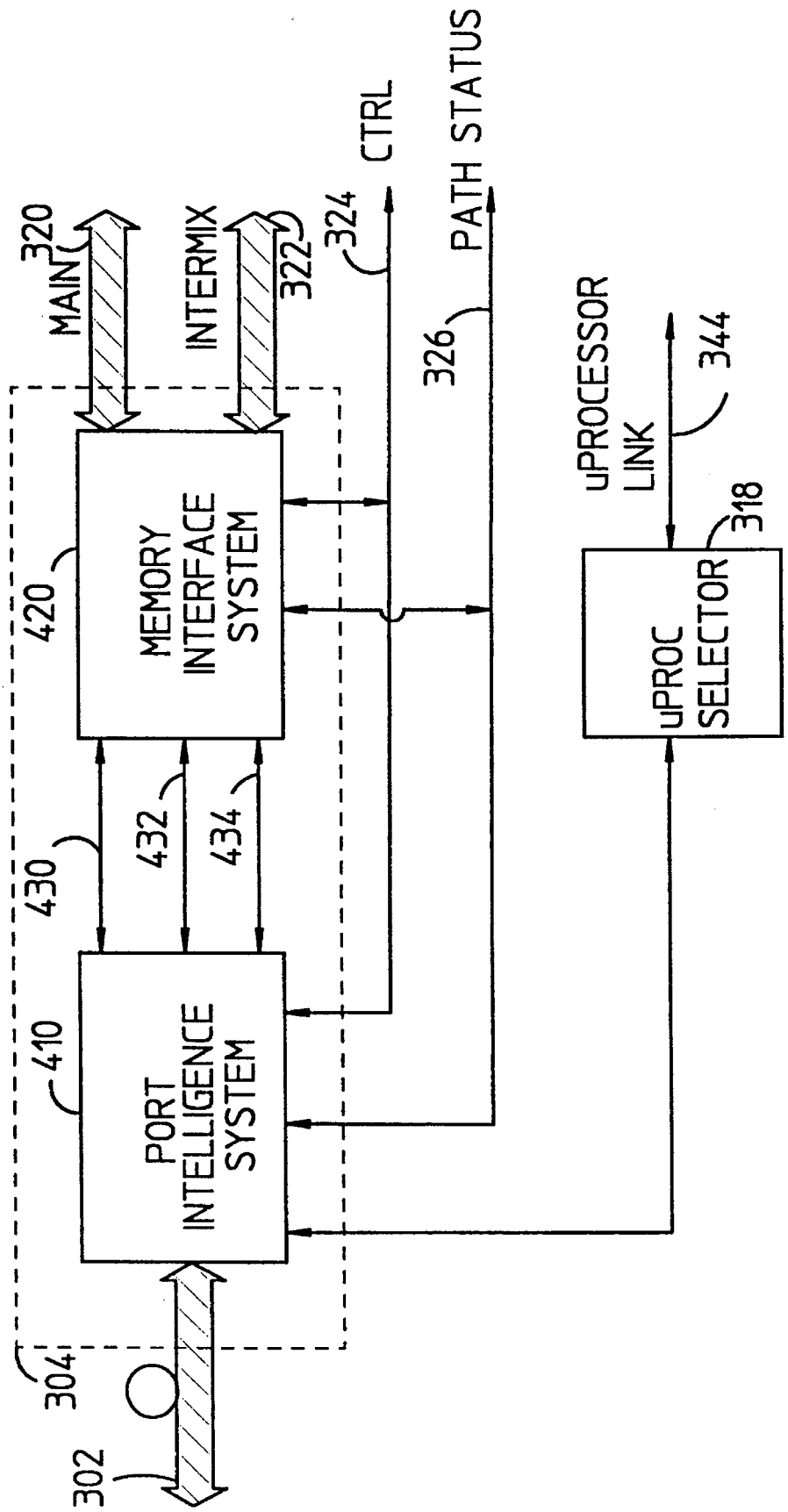
FIG. 4 shows a block diagram of the channel module in FIG. 3.

FIG. 4 shows a block diagram of the channel module in FIG. 3. The channel module 304 comprises a port intelligence system 410 and a memory interface system 420. In a preferred embodiment, the channel module 304 provides a 1063 MBaud bi-directional path into the fabric.

The port intelligence system 410 comprises at least one transceiver and a first application-specific integrated circuit (ASIC). Essentially, the port intelligence system 410 provides port intelligence adapted to transmit and receive data according to a specific protocol, preferably fibre channel, associated with the fiber optic channel 302. The port intelligence system 410 is interchangeable to accommodate a variety of protocols, such as asynchronous transfer mode (ATM). Additionally, the port intelligence system 410 can be adapted to be hooked up to channels with different bit rates. A conventional optical link card (OLC), such as an OLC266 manufactured by IBM, can be utilized to directly interface the port intelligence system 410 to the fiber optic channel 302. In a preferred embodiment, the first ASIC is configured to support three modes of operation: 266-, 531- and 1063-MBaud data transfer.

The memory interface system 420 comprises at least one frame buffer and a second ASIC which is configured differently from the first ASIC in the port intelligence system 410. The frame buffer may be random access memory with bit-sliced organization. Additionally, separate receive buffers and transmit buffers may be used. The second ASIC is a bit-sliced chip for memory management and is responsible for connecting the memory interface system 420 to the internal switch data paths via the main link 320 and the intermix link 322.

Figure 5:
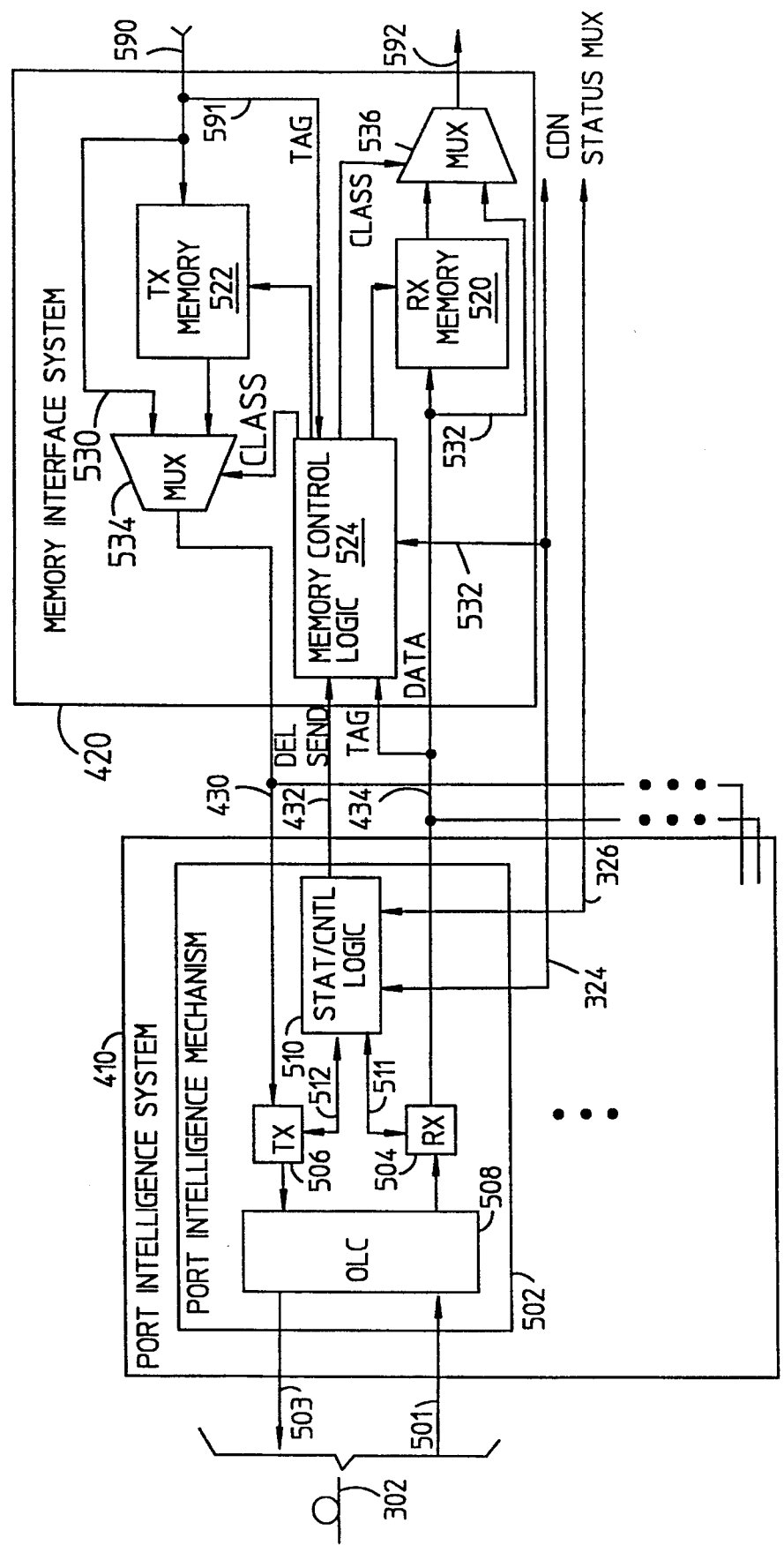
FIG. 5 shows a more detailed block diagram of the channel module.

FIG. 5 shows a more detailed block diagram of the channel module of FIGS. 3 and 4. The port intelligence system 410 has one or more port intelligence mechanisms 502. One port intelligence mechanism 502 is allocated to each fiber optic channel 302. Each port intelligence mechanism 502 has a receiver (RX) 504, a transmitter (TX) 506, an optical link card (OLC) 508, and a status/control (STAT/CNTL) logic 510. The receiver 504 and the transmitter 506 are adapted to receive and transmit data, respectively, through their corresponding input and output fibers 501,502 (shown collectively in FIG. 3 as channel 302) in accordance with the Fibre Channel industry standard protocol and at the channel's particular bit rate.

The OLC 508 is utilized to directly interface the port intelligence mechanism 502 to the fiber optic channel 302. The OLC 508 provides an optical-to-electrical conversion as well as a serial-to-parallel conversion between the input fiber 501 of the channel 302 and the receiver 504. Furthermore, the OLC 508 provides an electrical-to-optical conversion as well as a parallel-to-serial conversion between the output fiber 502 of the channel 302 and the transmitter 506.

The status/control logic 510 monitors and controls both the receiver 504 and the transmitter 506, as indicated by corresponding bidirectional control connections 511,512. Further, the status/control logic 510 exchanges control signals on control connection 324 with the CDN (item 314 in FIG. 3), provides status signals on connection 326 to the status MUX (item 310 in FIG. 3) indicative of, e.g., whether the corresponding port ($p_1$ through $P_i$) is available or busy, and forwards control signals to the memory interface system 420 via connection 432. The status/control logic 510 further recognizes when a new frame is received by the receiver 504 and determines the transfer class (either 1 or 2) as well as the length of data pertaining to each new frame. It should be noted that a frame could have no data, as for example, in the case of an SOFc1 frame (i.e., a start of frame for class 1 service), which is initially passed through the switch 200 for setting the switch 200 up to reserve a bidirectional path for a class 1 data transfer.

The memory interface system 420 is connected in series, or cascaded, with the port intelligence system 410, and particularly, with each port intelligence mechanism 502 contained therein. The memory interface system 420 generally provides class 1 bypass data connections 530,532 for class 1 data transfers and provides temporary storage for class 2 data transfers. For data storage relative to class 2 data transfers, the memory interface system 420 has a receive memory (RX MEMORY) 520 for source data, a transmit memory (TX MEMORY) 522 for destination data, and memory control logic 524 for controlling the receive and transmit memories 520,522. The receive memory 520 and the transmit memory 522 may be partitioned into a number of individual buffers or memory blocks, if desired.

Figure 6:
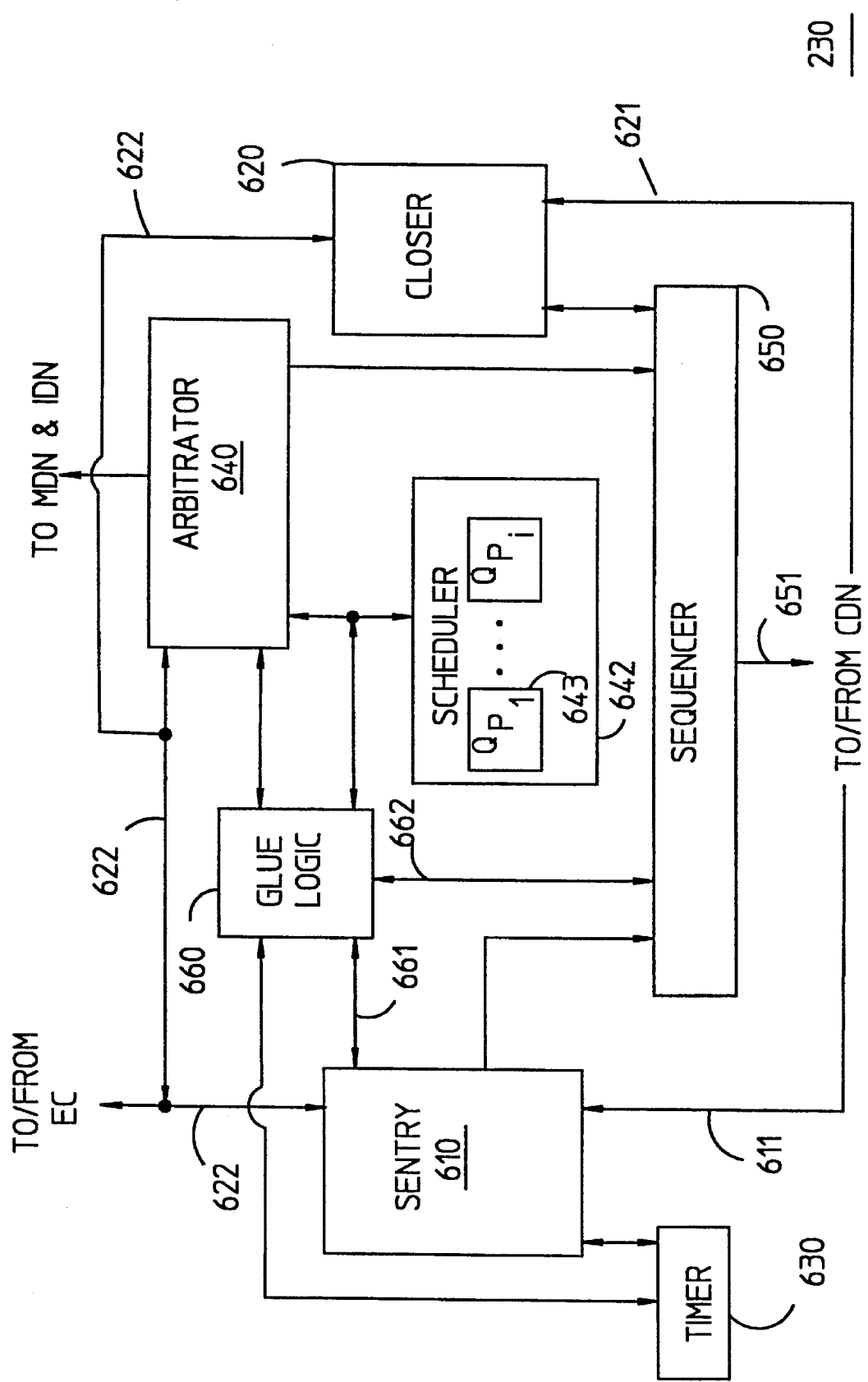
FIG. 6 shows a block diagram of the path allocation system in FIG. 3.

FIG. 6 shows a block diagram of the path allocation system in FIG. 3. The path allocation system 230 communicates with the channel module(s) (item 304 in FIGS. 3 and 4) and the element controller (EC) (item 240 in FIG. 3) via the control distribution network (CDN) (item 314 in FIG. 3). Basically, the path allocation system 230 controls all switching bandwidth within the fiber optic switch element and directs all frame flow. In addition to managing port and switch resources for allocating frame data paths through the fiber optic switch, the path allocation system 230 collects frame header information, validates each frame based upon the header information, initiates frame-reject (FRJT) flags for discrepant frames, initiates frame-busy (FBSY) flags for frames which cannot be delivered within a predetermined time-out value and collects performance statistics for the element controller.

The path allocation system 230 allocates the data paths through the switch module 220. A sequencer 650 is connected to the CDN (item 314 in FIG. 3) via a control connection 651. A sentry 610 communicates to the CDN 314 via the control connection 611 and is connected to the sequencer 650. A timer 630 communicates to the sentry 610 and glue logic 660. The glue logic 660 communicates control signals with the sentry 610 via the control connection 661, and communicates control signals to the sequencer 650 via the control connection 662. The scheduler 642 maintains a plurality of destination queues ($Q_{p1}$–$Q_{pi}$) 643 which correspond respectively with each of the ports ($p_1$ through $P_i$ in FIG. 3. The scheduler 642 communicates with the glue logic 660.

An arbitrator 640 is connected to the scheduler 642, the glue logic 660, and the sequencer 650. The arbitrator 640 also communicates to the MDN and IDN (items 312 and 316 in FIG. 3 respectively). A closer 620 monitors the sequencer 650 and receives control signals from the CDN via the control connection 621. The closer 620 also communicates an EC interface (not shown) which in turn communicates to the sentry 610, the arbitrator 640, and the element controller (EC) (item 240 in FIG. 3) via the connection 622. In a preferred embodiment, the EC interface is a DSP or some similar processor.

The sequencer 650 can be implemented with any suitable logic, for example, as a state machine in a conventional field programmable gate array (FPGA) with the functionality described below. The sequencer 650 serves as the primary interface to the CDN (item 314 in FIG. 3) via the control connection 651. It essentially arbitrates the CDN among the sentry 610, the arbitrator 640, and the closer 620.

The sentry 610 can be also be constructed with any suitable logic, for example, as a state machine in an FPGA. It monitors the new frame status (new frame arrived signal) corresponding with the ports ($p_1$ through $p_i$) via the status MUX (item 310 in FIG. 3) and status/control logic (item 510 in FIG. 5) and determines when a new frame is available for routing through the MDN (item 312 in FIG. 3). In essence, the sentry 610 collects data of validated, buffered frames, maps the destination port identification (DID) from the frame header of an incoming frame to an appropriate port via a routing table(s), determines the appropriateness of a new frame for a destination port (i.e., whether the frame can be intermixed onto a class 1 stream), and determines whether a new frame is proper or in error.

The sentry 610 and timer 630, together, further provide queue command information to the scheduler 642, via the glue logic 660. The queue command information can include an add signal, a frame busy (FBSY) signal, and a delete (DEL) signal. The add signal is sent when a new frame is within the receive memory (item 520 in FIG. 5) of the memory interface system and is ready to be routed through the fiber optic switch 200. When an add signal is sent from the sentry 610 to the scheduler 642, the following information is sent: the add command, the destination port (or queue), a tail pointer, a class indicator, the source port, source buffer number, head pointer.

The FBSY signal is sent when the new frame has resided in the receive memory for a predetermined time period (FBSY time period) which is considered too lengthy for the system. The FBSY signal which is sent by the timer 630 to the scheduler 642 generally includes same information as the add signal.

The delete signal is sent when the frame has resided in the receive memory for another predetermined time period (delete time period), which is longer than the FBSY time period, and which warrants deletion of the frame. A delete signal may also be issued for other error conditions. The delete signals which are sent by either the timer 630, or the sentry 610, to the scheduler 642 includes the following path data: (a) the delete command, (b) the source port, and (c) the source buffer number.

The timer 630 can be implemented with any conventional processing mechanism, for instance, a digital signal processor (DSP). The timer 630 measures the time in which a new frame resides within the receive memory (item 520 in FIG. 5) and determines when an FBSY signal and when a delete signal should be asserted by the sentry 610. For this purpose, the timer 630 maintains internally an FBSY/DEL clock for tracking the FBSY time period and the delete time period for each new frame. The timer 630 receives an initiate (init) signal from the sentry 610 for starting the FBSY/DEL clock when a new frame is ready to be transferred from a port, receives a timer clear (clr) signal from the arbitrator 640 via glue logic 660 for the purpose of clearing the FBSY/DEL clock, and outputs the FBSY signal and the delete signal to the sentry 610 after, respectively, an FBSY time period and a delete time period, provided that no timer clear signal has been received from the arbitrator 640. The timer clear signal essentially terminates the FBSY/DEL clock of the timer 630.

The glue logic 660 primarily serves as an interface among the sentry 610, the timer 630, the sequencer 650, the arbitrator 640, and the scheduler 642. In the preferred embodiment, the glue logic 660 is implemented as a state machine via an FPGA or other suitable logic. The glue logic 660 also performs other functionality in the preferred embodiment. The glue logic 660 monitors transmission ready (txready) signals and intermix ready signals through the sequencer 650, which indicate when a port intelligence mechanism (item 502 in FIG. 5) is ready to receive a data frame. The glue logic 660 performs a circular sequence wherein it searches in sequence through those txready and intermix ready signals which are asserted, by masking out those which are deasserted, to determine the next destination port which is to receive data (as well as the next destination queue 643 to service). The glue logic 660 forwards the identity of the next destination port to be serviced to the scheduler 642. In this regard, the glue logic 660 forwards a word to the scheduler 642 comprising a base pointer address, which identifies the heads of double link list queues, and a destination queue indicator, which identifies a particular destination queue.

The scheduler 642, which can be implemented with any convention processing mechanism, such as a DSP, maintains and manages the destination queues $(Q_{p1}-Q_{pi})$ 643 and receives the queue management commands, particularly, an add signal, a FBSY signal, and a delete signal, from the sentry 610. The scheduler 642 also receives a next destination port signal from the glue logic 660. The next destination port signal indicates the next port to service (and hence, the next destination queue 643 to service).

The scheduler 642 maintains and updates a destination queue $(Q_{p1}-Q_{pi})$ 643 for each of the fiber optic ports (p1 through pi) and is configured to store queue entries associated with each corresponding port. Each queue entry has path data which identifies the following: (a) source port from which data is to be transferred from, (b) the source buffer number in receive memory (item 520 in FIG. 5) where the frame is located, and (c) flags which indicate whether the queue entry is a normal frame entry, a frame for starting a class 1 data transfer ("SOFcl") entry, a Q-Head entry, or a Q-tail entry.

The arbitrator 640 is implemented with any suitable logic, preferably a state machine implemented with an FPGA. The arbitrator 640 tracks the status of the port intelligence mechanisms (item 502 in FIG. 5), determines when the port intelligence mechanisms are available for transmitting and receiving data, and arbitrates connections between the port intelligence mechanisms. Specifically, the arbitrator 640 monitors transmission ready (txready), intermix ready, intermix bus ready, and receive ready (rxready) signals generated by the status/control logic (item 510 in FIG. 5) of the port intelligence mechanisms. When the arbitrator 640 receives a transfer request signal from the scheduler 642 to transfer data from a particular source port to a particular destination port, the arbitrator 640 determines whether the transfer is either class 1 (circuit switching), class 2 (frame switching) or some other class of service.

While the present invention has been illustrated and described in connection with the preferred embodiment, it is not to be limited to the particular structure shown. It should be understood by those skilled in the art that various changes and modifications may be made within the purview of the appended claims without departing from the spirit and scope of the invention in its broader aspects.

What is claimed is:

1. An apparatus for facilitating data communications in fibre channel network, the fibre channel having first and second fabric ports, the apparatus comprising:

a switch module connected to the first fabric port and the second fabric port;

a channel control box disposed between the switch module and the first fabric port;

first and second fiber optic channels, the first fiber optic channel disposed between the first fabric port and the channel control box, the second fiber optic channel disposed between the second fabric port and the channel control box;

an element controller connected to the switch module; and a path allocation system connected to the element controller and the switch module, the path allocation system allocates an interconnect path between the first fabric port and the second fabric port, wherein the switch module comprises:

a status MUX disposed between the channel control box and the path allocation system, the status MUX is configured to receive a plurality of status signals indicative the first and second fiber optic channels;

a main distribution network disposed between the channel control box and the path allocation system, the main distribution network interconnects the first and second fiber optic channels; and a control distribution network disposed between the channel control box and the path allocation system.

2. The apparatus of claim 1, wherein the channel control box comprises:

a port intelligence system connected to the first and second fabric ports, the port intelligence system is configured according to a first protocol; and a memory interface system connected to the port intelligence system, the memory interface system receives and transmits data from the first and second fabric port to the first and second fiber optic channels.

3. The apparatus of claim 2, wherein the port intelligence system comprises at least one transceiver and a first application-specific integrated circuit.

4. The apparatus of claim 3, wherein the memory interface system comprises at least one frame buffer and a second application-specific integrated circuit, the second application-specific integrated circuit is connected to the main distribution network.

5. The apparatus of claim 4, wherein the at least one frame buffer is a random access memory configured with a bit-sliced organization.

6. The apparatus of claim 5, wherein the first protocol is Fibre Channel protocol.

* * * * *